United States Patent Office 3,704,262
Patented Nov. 28, 1972

3,704,262
SURFACTANT FOR ELECTROLYTE-CONTAINING PROCESSING SOLUTIONS
Joseph A. Komor, Allentown, Pa., assignor to GAF Corporation, New York, N.Y.
No Drawing. Filed Mar. 19, 1970, Ser. No. 21,197
Int. Cl. B01f 17/02, 17/14
U.S. Cl. 252—353      2 Claims

ABSTRACT OF THE DISCLOSURE

Surfactant compositions and baths for specific textile wet-processing operations are disclosed. The compositions exhibit surfactant qualities even in the presence of up to ten percent (10%) electrolytes including alkalies in the baths and are not adversely affected by water hardness, oxidative reagents or elevated bath temperatures. The compositions includes a blend of phosphate esters of 8-carbon alcohols with soluble sulphate esters of alkoxylated alcohols and alkyl phenols.

FIELD OF THE INVENTION

This invention relates to surfactant compositions and, more particularly, to such compositions for use in textile wet-processing operations in the presence of high concentrations of electrolytes, including alkalies.

BACKGROUND OF THE INVENTION

Many textile treatments are wet-processing operations. These include scouring, bleaching, dyeing, fixing, weighting and mercerizing among others. Included in such operations are specific operations that use solutions containing dissolved electrolytes such as salts and alkalies. Sodium hydroxide, up to ten percent (10%), but usually at three percent (3%), concentration is a common electrolyte ingredient in such baths.

Surfactants are commonly used to enhance the contact between the processing solutions and the fibers of the treated textile fabrics. Such surface-active agents are also used to increase the rate of penetration of the processing solutions into the capillaries between the fibers. The economic advantage of increasing the rate of penetration or contact of any processing operation is readily apparent.

Generally, surfactants improve the overall efficiency of textile wet-processing operations. However, many surfactants which exhibit rapid wetting in tap-water are rendered completely useless in solutions containing electrolytes. In turn, those products that provide at least adequate performance in electrolyte or caustic solutions fail to give satisfactory wetting in tap-water. This anomaly has necessitated the development of myriad surfactants, each tailored to meet the specific requirements of each processing bath. Since many of those surfactants, which are active in the presence of electrolytes, are suitably effective. Only over very narrow margins of concentrations of specific electrolytes, each textile plant is required to stock and use many different compositions of surfactants.

It has long been desired to perfect a single surfactant composition that will provide efficient wetting capabilities over the broad range of electrolyte contents and concentrations ranging from tap-water containing less than 0.01 percent (0.01%) electrolytes to solutions containing up to ten percent (10%) electrolytes and including alkaline solutions equivalent to up to ten percent (10%) sodium hydroxide. Such a single surfactant compositions must be stable in the common baths as well as in waters of all hardnesses and under ranges of temperatures extending from room temperatures through the boiling points of the various processing solutions.

SUMMARY OF THE INVENTION

I have discovered that certain blends of specific classes of surfactants will provide excellent and efficient wetting properties for use in textile baths under the broad range of commonly encountered electrolyte contents including alkalies as individual components or as blended mixtures of alkalies.

The compositions according to the major aspect of this invention may be described as a blend of surfactants including:

(a) 30 to 90 parts by weight of the reaction product of an 8-carbon alkanol with a phosphating agent leading to a complex mixture of phosphate esters, and;
(b) 70 to 10 parts by weight of a solubilized sulfate ester of a nonionic alkoxylated alkanol or alkyl phenol intermediate.

This blend of surfactants is effective in concentrations ranging from 0.01 percent (0.01%) to 1 percent (1%) by weight of solution in improving wettability in various textile wet-processing solutions. Within these ranges, the compositions of this invention are effective in processing solutions ranging from pure distilled water through tap water to scouring and bleaching solutions containing up to ten percent (10%) of electrolytes including alkalies and alkali equivalents. Further, the compositions of this invention are effective in improving wettability at temperatures ranging from 4° C. to the boiling points of the commonly used electrolyte-containing processing baths such as bleaching and scouring baths.

Another aspect of this invention includes the textile wet-processing baths containing the blend of surfactants according to this invention. Such baths should contain, in addition to the bath agents, the surfactant blend according to this invention in the concentration range of 0.01 percent (0.01%) to 1 percent (1%) by weight of such baths. Among the baths included in the ambit of this invention are the scouring baths containing up to ten percent (10%) by weight of alkali or alkali equivalents, i.e. sodium sulphate, etc.; and alkaline bleaching baths including peroxides, perborates, isocyanurates, etc., as oxidizers as well as buffering electrolytes. The invention has proven particularly useful in such baths.

Another aspect of this invention includes the process of using baths containing these novel compositions for the wet-processing of textiles and includes the processes of scouring and bleaching with such baths. Similar operations including dyeing, rinsing and washing utilizing the improvements in such operations resulting from the improved wettability derived from the novel qualities of the compositions according to this invention are included within the ambit of the processing aspects of this invention.

The two-component blend upon which this invention is based results from the discovery of the phenomenon that certain alkoxy-alcohol and alkyl phenol sulfates improve the solubility, in electrolyte solutions, of a particular group of phosphate esters of aliphatic 8-carbon alcohols. This group of phosphate esters includes the reaction products of individual isomeric aliphatic octanols, or isomeric mixtures of the octanols; with $P_2O_5$, $POCl_3$, $PCl_3$ or polyphosphoric acid. The reaction products contain a complex mixture of phosphate esters which may or may not contain polyphosphates and/or residual octyl alcohols.

It has been noted that when such phosphate esters, which exhibit excellent wettability are added to aqueous electrolyte-containing solutions and more particularly to textile baths containing alkalies and/or other electrolytes, their solubility is reduced. The presence of the electrolytes so reduces the solubility of the phosphate esters that their concentrations in the solutions are below that at which they are effective wetting agents. Visually, in the presence of electrolytes, the solutions of the phosphates become turbid, and upon testing, their wetting efficiencies are reduced below effective levels.

I have found surprisingly that by blending at least thirty percent (30%) by weight of certain alkoxylated alcohol and alkyl phenol sulfates with the aforementioned phosphates, the solubility and wettability of the phosphate esters, in the presence of electrolytes, is reinstated and increased and that the blend of these two components forms a composition that provides excellent detergency for broad spectrum use in the wet-processing of textiles.

The aforementioned sulfate esters having these qualities are characterized by the formula:

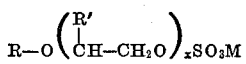

where R is an alkyl radical containing 9–16 carbon atoms, or an alkylphenyl group in which the alkyl substituents contain a total of 6–12 carbon atoms; R' is H, or a mixture of H and $CH_3$ wherein the alkoxylate mixture exhibits hydrophilic properties; $x$ is a number corresponding to ten to seventy percent (10% to 70%) alkoxy by weight of the nonionic intermediate; and M is a water-solubilizing cation.

The R substituents may be derived from commercial alkanol and alkylphenol mixtures. The alkoxylated alcohol and alkyl phenol sulfates corresponding to the above formula may be prepared as set forth in the U.S. Pat. 2,766,212 which discloses among others, the preparation of compounds within the scope of these particularly effective sulfates.

M is a water solubilizing cation for the ethoxylated alkanol esters. These solubilizing cations include the ions of the alkali metals, the alkaline earth metals, $NH_4$, morpholine, mono-, di-, or tri-ethanolamines or other low-molecular weight, water-soluble amines.

The octanol phosphate esters that are the other of the necessary components of the blended composition of this invention are the product of the reaction of octanols with $P_2O_5$; $POCl_3$; $PCl_3$ or polyphosphoric acid leading to a complex mixture of phosphate esters including varying proportions of mono-, di-, and tri-phosphates. The reaction products may be completely esterified or may include polyphosphates and/or residual octyl alcohols. The phosphate esterification reaction is carried out according to procedures generally practiced in the industry.

Polyphosphoric acids may be used having phosphoric acid anhydride contents expressed as $P_2O_5$ of about eighty to eighty-five percent (80% to 85%) or $P_2O_5$ itself may be used directly in the process as described in U.S. Pats. 3,004,056 and 3,004,057. The products useful as the phosphate ester components of this invention differ from those described as resulting from the reactions set forth in the aforesaid patents in that they are phosphate esters of aliphatic octanols and are without the alkoxylate groupings shown in the compounds of the references. The reaction proportions and conditions are within the scope of the teachings of said patents which are herein incorporated by reference.

$POCl_3$ may also be used as a phosphating agent in accordance with common esterification procedures and the products of such a reaction with aliphatic octanols are similarly effective components of the compositions of this invention.

The octanols for esterification by the phosphating agents described above include n-octanol, iso-octanol, 2-ethylhexanol and the other commercially available octanol isomers and include the commercially available mixtures of octanols designated as C–8 alcohol blends.

When the two components of the compositions of this invention are blended, they may be utilized by solution from their dry form in the mixture or the blended components may be dissolved to form stock solutions. The stock solutions may also be prepared by the direct solution of each component in the stock solution solvent, which is preferably water. All the blended compositions within the limits of this invention are soluble in solutions containing up to at least seven percent (7%) by weight of free sodium hydroxide and in solutions containing up to at least ten percent (10%) by weight of salts commonly used in textile wet-processing. Similarly, the compositions within the scope of this invention require very low concentrations to yield standard "wetting"-times by the Draves Textile Wetting Test (AATCC) in salt-containing solutions. All the compositions according to this invention showed 25-second Draves Wetting Times in the presence of seven percent (7%) of sodium hydroxide at concentrations by weight below 0.050 percent (0.050%) of the total solution of the active blend.

An additional advantage of the compositions formulated within the limits propounded for this invention is the fact that they exhibit little if any foaming. Any foams that form under conditions of violent agitation were unstable and were quickly and spontaneously dissipated.

In general, it was found that the compositions of this invention were effective when used in textile wet-processing solutions within the range of 0.01 percent (0.01%) to 1.0% by weight with the range of 0.05 percent (0.05%) to 0.15 percent (0.15%) being preferred as effective and economically feasible in both bleaching and scouring baths containing seven percent (7%) sodium hydroxide or its equivalent. For wool scouring baths using sodium sulfate and sodium bisulfate, concentrations of 0.10 percent (0.10%) by weight of the blend to the total bath were both economical and effective.

For the purpose of demonstrating the effectiveness of the compositions of this invention, various blends of compositions within the scope of this invention were prepared and solutions thereof in electrolytes were compared with the components of the blends alone, or blends of certain effective components with other components bordering upon but outside the limits found to be effective for this invention. These solutions were evaluated for wettability in seven percent (7%) caustic solution by the Draves Textile Wetting Test using 5-gram cotton skeins and 3-gram hooks. The surfactant materials were added to the seven percent (7%) caustic solution and the percentage concentration of the surfactant blend required for a 25-second wetting time was determined.

In addition, the compositions that had been compared for wettability were compared for solubility at 0.05 percent (0.05%) and evaluated by visual observation. A clear solution indicated solubility of the composition, whereas turbidity was an indication that the composition was not completely soluble. According to this test, all the blend compositions within the ambit of this invention were uniformly soluble in both caustic solutions and in solutions containing other electrolytes equivalent to caustic for use in textile wet-processing. Many of those without the ambit defined herein were insoluble as well as unsuitable.

The table below lists the solubility data and the Draves test results of the various compositions that were the subject of the comparison and lie both within and without the ambit of this invention.

| Example | Percent Phosphate | Percent Sulfate | Phosphated alkanol | R | X | M | Solubility | Draves[1] |
|---|---|---|---|---|---|---|---|---|
| 1 | 75 | 25 | 2-ethylhexanol | Alfol 810 [2] | 2.5 | $NH_4$ | S | 0.033 |
| 2 | 75 | 25 | Iso-octanol | do.[2] | 2.5 | $NH_4$ | S | 0.042 |
| 3 | 80 | 20 | do | do.[2] | 2.5 | $NH_4$ | S | 0.053 |
| 4 | 50 | 50 | do | do.[2] | 2.5 | $NH_4$ | S | 0.052 |
| 5 [3] | 100 | | 2-ethylhexanol | | | | T | 0.100 |
| 6 [3] | 100 | | Iso-octanol | | | | T | 0.088 |
| 7 | 75 | 25 | do | Neodol 25 [4] | 3 | K | S | 0.036 |
| 8 [3] | 75 | 25 | 2-ethylhexanol | $C_8$ alkanol | 1.5 | $NH_4$ | T | 0.063 |
| 9 [3] | 75 | 25 | do | 2-octanol | 4 | $NH_4$ | T | 0.067 |
| 10 | 75 | 25 | do | Alfol-1014 [5] | 5 | $NH_4$ | S | 0.046 |
| 11 | 75 | 25 | do | $n-C_{6-7}H_{12-14}$ phenol | 3.3 | $NH_4$ | S | 0.042 |
| 12 | 75 | 25 | do | $C_{12}H_{24}$ phenol | 5.83 | $NH_4$ | S | 0.045 |
| 13 | 75 | 25 | do | $C_{14}$ alkanol blend | 4 | $NH_4$ | S | 0.048 |
| 14 [3] | 75 | 25 | do | Oleyl alkanol blend | 7 | $NH_4$ | T | 0.280 |
| 15 | 75 | 25 | do | $n-C_{6-7}H_{12-14}$ phenol | 10 | $NH_4$ | S | 0.047 |

[1] Percent composition for 25-second wetting in 7% NaOH.
[2] $C_{8-10}$ alkanol blend.
[3] Comparative example.
[4] $C_{12-15}$ alkanol blend.
[5] $C_{10-14}$ alkanol blend.

NOTE.—S=Soluble; T=Turbid.

As is set forth above, the invention comprises the formulation of a blend of the two specific classes of compounds set forth in their specified concentration ranges. This, of course, does not preclude the inclusion into commercial compositions, according to this invention, of other ingredients useful for their specific purposes in the preparation of specific textile wet-processing baths. These include dyestuffs, buffers, hand improvers, lusterants, and weighting agents among others.

I claim:

1. A blend of surfactants for use in textile-wet processing solutions containing up to about 10% alkali or electrolyte, consisting essentially of (a) 30 to 90 parts by weight of a complex mixture of phosphate ester reaction products of phosphorating agents and eight-carbon alcohols, and; (b) 70 to 10 parts by weight of a compound of the formula:

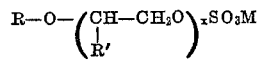

wherein R is an alkyl radical containing nine to sixteen-carbon atoms or an alkylphenyl grouping in which the alkylphenyl substituents contain a toal of six to twelve-carbon atoms; R' is H or a mixture of H and $CH_3$ wherein the alkoxylate mixture exhibits hydrophylic properties, $x$ is a number corresponding to 10% to 70% alkoxylate by weight of the nonionic intermediate; and M is a water-solubilizing cation.

2. The blend according to claim 1 where (a) is phosphate ester of iso-octanol and the R component of (b) is a commercial mixture of 12–15 carbon alkanols.

References Cited

UNITED STATES PATENTS 2,794,004  5/1957  Ratti _____ 252—353
2,766,212  10/1956  Grifo _____ 252—307 X RICHARD D. LOVERING, Primary Examiner U.S. Cl. X.R.

8—101; 252—102, 103, 156, 186, 351, 355, DIG 1